US007524263B2

(12) United States Patent
Johnson et al.

(10) Patent No.: US 7,524,263 B2
(45) Date of Patent: Apr. 28, 2009

(54) POWERTRAIN WITH POWERSPLIT PUMP INPUT AND METHOD OF USE THEREOF

(75) Inventors: Kris W. Johnson, Peoria, IL (US); Charles E. Rose, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 327 days.

(21) Appl. No.: 11/485,777

(22) Filed: Jul. 13, 2006

(65) Prior Publication Data

US 2008/0032842 A1 Feb. 7, 2008

(51) Int. Cl.
*B60K 1/02* (2006.01)

(52) U.S. Cl. .......................................................... 477/3

(58) Field of Classification Search .................. 184/6.1, 184/6.3; 475/2, 5, 149, 153, 159; 477/3
See application file for complete search history.

(56) References Cited

U.S. PATENT DOCUMENTS 2,505,713 A 4/1950 Lucia
2,538,299 A * 1/1951 Dewandre ................ 123/41.46
3,298,250 A 1/1967 Moss et al.
4,275,617 A * 6/1981 Kalns ......................... 475/136
5,823,282 A 10/1998 Yamaguchi
5,947,854 A * 9/1999 Kopko ........................... 475/2
5,989,151 A * 11/1999 Kershaw et al. ............... 477/13
6,293,233 B1 9/2001 Hiraoka
6,695,589 B1 2/2004 Dougan et al.
6,739,305 B2 5/2004 Takahara et al.
6,863,139 B2 * 3/2005 Egami et al. ............... 180/53.8
6,863,140 B2 3/2005 Noreikat et al.
6,964,631 B2 11/2005 Moses et al.
7,000,601 B2 * 2/2006 Yasui et al. ................. 123/561
7,086,977 B2 * 8/2006 Supina et al. .................. 475/5
2004/0187833 A1 9/2004 Lane
2006/0123784 A1 6/2006 Algrain et al.

* cited by examiner

*Primary Examiner*—Dirk Wright
(74) *Attorney, Agent, or Firm*—Liell & McNeil

(57) ABSTRACT

A powertrain includes an engine operatively connected to a primary power consuming device to transmit power thereto. The powertrain also includes a motor and a pump. The power output of the motor is independent of the power output of the engine. An epicyclic geartrain includes first, second and third members. The first member is operatively connected to the engine to receive power therefrom. The second member is operatively connected to the motor to receive power therefrom. The third member is operatively connected to the pump to transmit power thereto.

20 Claims, 3 Drawing Sheets

POWERTRAIN WITH POWERSPLIT PUMP INPUT AND METHOD OF USE THEREOF

GOVERNMENT RIGHTS

This invention was made with Government support under Contract No. DE-FC26-04NT42189 awarded by the Department of Energy. The Government has certain rights in this invention.

TECHNICAL FIELD

This disclosure relates to a powertrain for a pump, and more particularly to a pump that is operatively connected to an engine and a motor via an epicyclic geartrain.

BACKGROUND

A typical powertrain includes an engine and several pumps, including an engine oil pump, a cooling fan, a transmission pump, a coolant pump, and various compressors. The rotors of the pumps are typically driven by the engine crankshaft, and therefore the rotational speed of the rotors, and the power delivered to the pumps, are dependent on the speed of the crankshaft. However, the speed of the crankshaft is dictated by the requirements of a primary power consuming device, such as a vehicle drivetrain or electrical generator, and not the requirements of the pumps.

Accordingly, some pumps must be sized to achieve maximum required pressure or fluid flow at low crankshaft speeds; therefore, the pumps may produce more pressure or fluid flow than is actually required by the powertrain when the crankshaft rotates at higher speeds. When producing more pressure or fluid flow than is actually necessary or desired, the pumps use more power from the crankshaft than is actually necessary, thereby reducing the efficiency of the powertrain.

For example, maximum required oil flow occurs when an engine operates at peak torque output. Peak torque output may occur at a crankshaft speed that is less than a typical operating crankshaft speed range. Thus, the oil pump must be sized to achieve the maximum required oil flow at a crankshaft speed that is lower than the typical engine operating speed range; when the engine is operated within the typical operating crankshaft speed range, the oil pump produces more oil flow than is required, and a pressure bypass valve diverts excess pump flow, resulting in unnecessary pump power usage and parasitic energy loss from the powertrain.

Similarly, the amount of fluid flow required to be produced by a pump, and accordingly the amount of power required by the pump, may vary significantly with various powertrain operating parameters and conditions. However, because the speed of the pump rotor, and accordingly the power used by the pump, is controlled by the speed of the crankshaft, the pump must be sized to produce the maximum flow rate that may be required at any given crankshaft speed.

For example, an engine cooling fan is typically driven by the crankshaft. Although the amount of air flow required by the powertrain may vary significantly with vehicle speed, ambient atmospheric temperature, etc., the fan must be sized to produce the maximum amount of air flow that may be required at any given engine speed. Accordingly, the fan may generate more air flow than conditions require, and therefore may use more power from the crankshaft than conditions require.

Similarly, a transmission pump is typically driven by a crankshaft and provides pressurized fluid to lubricate and cool the transmission parts, and to actuate torque transmitting devices such as clutches and brakes to effectuate speed ratio changes. However, the amount of fluid flow and pressure to the transmission may vary depending on speed ratio shift activity, engine speed, engine load, etc. Accordingly, the transmission pump may generate more fluid flow and pressure than conditions require; excess fluid from the pump is typically exhausted to a reservoir.

Various prior art mechanisms attempt to overcome the shortcomings inherent in having pump speed directly determined by crankshaft speed. In hybrid vehicles driven by an engine and a motor, a mode of operation is possible in which the engine is off and the vehicle is driven solely by the motor. The prior art includes powertrains with two pumps, one being driven by the crankshaft of the engine, and another being driven by the rotor of the motor when the engine is off. However, having two pumps results in additional mass, cost, and mechanical complexity. Moreover, the motor in such hybrid vehicles also drives the vehicle, and, therefore, the speed of the motor-driven pump may be dictated by the requirements of the vehicle drivetrain and not by the pump, which results in the same inefficiencies noted above pertaining to crankshaft-driven pumps.

Some prior art powertrains, such as the one disclosed by Moses et al. in U.S. Pat. No. 6,964,631, include a motor that drives a pump via a freewheel clutch only when the speed of a motor-driven element exceeds the speed of a crankshaft-driven element. Accordingly, when the engine is off, the motor can drive the pump.

The prior art also includes pump systems, such as the one disclosed by Kopko in U.S. Pat. No. 5,947,854, in which a primary motor and an auxiliary motor are connected to a pump via an epicyclic gearing system. The primary motor is operated at a constant speed, and the auxiliary motor is driven at variable speeds to control the speed of the pump rotor. However, the speed of the primary motor is constant, and both the primary and auxiliary motors drive only the pump. Accordingly, the pump system of Kopko is not applicable to typical powertrains in which the speed of the engine is variable and is dictated not by the pump, but by another power consuming device.

In U.S. Pat. No. 2,505,713, Lucia discloses a supercharger compressor that is connected to an engine crankshaft via epicyclic gearing to be driven thereby. An exhaust driven turbine is selectively connectable to the epicyclic gearing via a freewheel clutch when the turbine speed exceeds the speed of a crankshaft-driven member. However, the speed of the turbine is dependent upon the speed of the crankshaft (the amount of exhaust driving the turbine is related to engine speed and engine load), and therefore the turbine's efficacy in providing power to the supercharger is directly related to crankshaft speed.

Dougan et al. disclose, in U.S. Pat. No. 6,695,589 a transmission pump that is driven by an electric motor. However, the motor must be of sufficient size to power the pump by itself, which may increase the mass of the powertrain and require additional packaging space. Moreover, driving the pump solely by the electric motor introduces inefficiencies since, assuming that the power source for the electric motor, such as a battery, is charged by the engine, energy losses are incurred when rotary power from the crankshaft is converted to chemical energy in the battery, and when the chemical energy is converted to electrical energy for the motor, and again when the electrical energy is converted to rotary power in the motor.

The present disclosure is directed to one or more of the problems set forth above.

SUMMARY OF THE DISCLOSURE

A powertrain includes an engine that is configured to produce rotary power and that has an engine output member characterized by a selectively variable rotational speed. The powertrain also includes a motor that is configured to produce rotary power and that has a rotor characterized by a selectively variable rotational speed that is independent of the rotational speed of the engine output member. The powertrain further includes a primary power consuming device that is selectively operatively connectable to the engine to selectively receive rotary power therefrom, and a secondary power consuming device, namely, a pump. An epicyclic geartrain has first, second, and third members. The first member is operatively connected to the engine to receive rotary power therefrom; the second member is operatively connected to the motor to receive rotary power therefrom; and the third member is operatively connected to the pump to transmit rotary power thereto.

A corresponding method of operating a machine that includes an engine having an engine output member, a motor having a rotor, and a pump is also provided. The method includes transmitting rotary power from the engine output member to the pump via a first member and a second member of an epicyclic geartrain. The method also includes varying the rotational speed of the engine output member in response to a command to change the amount of power supplied by the engine to a primary power consuming device different from the pump. The method further includes transmitting rotary power from the rotor to the pump via the second member and a third member of the epicyclic geartrain. The rotor is characterized by a selectively variable rotational speed that is independent of the rotational speed of the engine output member.

Another method includes providing rotary power to the pump exclusively from an engine when the engine speed is above a predetermined value; and providing rotary power to the pump from the engine and from the motor concurrently when the engine speed is below the predetermined value and greater than zero.

DETAILED DESCRIPTION

Figure 1:
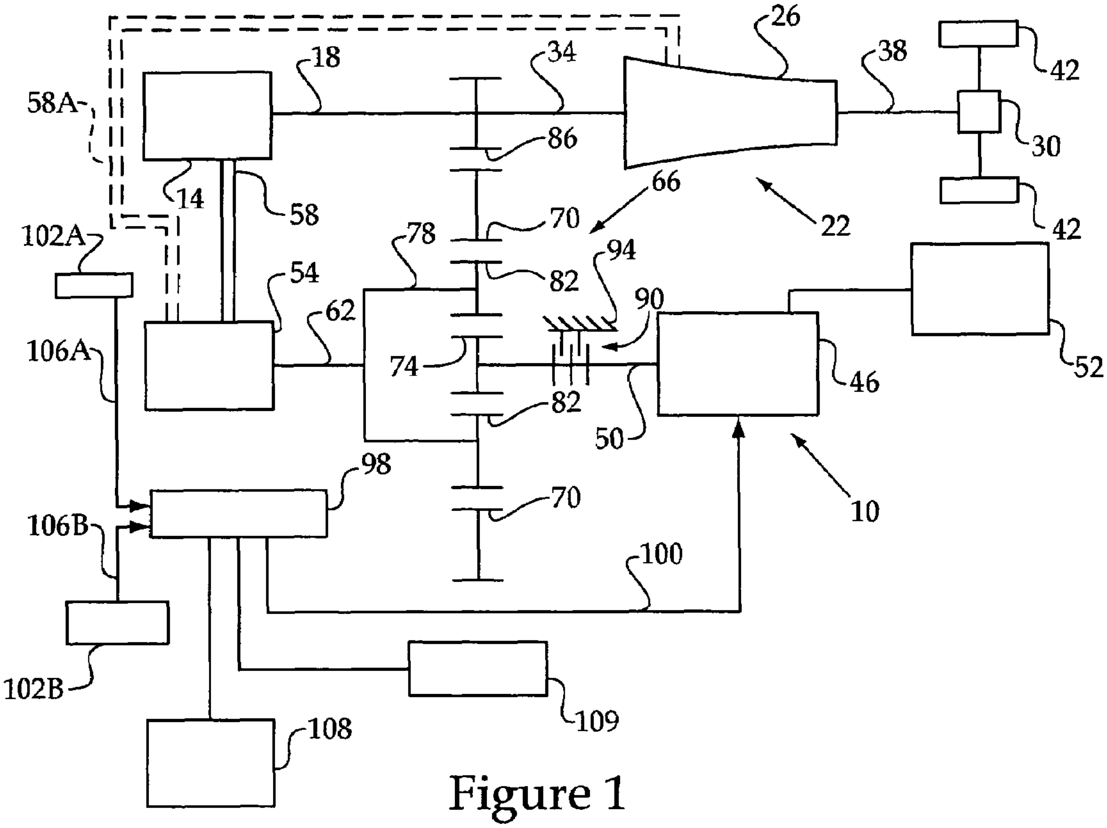
FIG. 1 is a schematic depiction of a powertrain including a pump operatively connected to an engine and a motor through an epicyclic geartrain.

Referring to FIG. 1, a powertrain 10 is schematically depicted. The powertrain 10 includes an engine 14 having an engine output member such as crankshaft 18. The engine 14 is configured to produce rotary power, as understood by those skilled in the art, and to transmit the rotary power through rotation of the crankshaft 18.

The powertrain 10 also includes a primary power consuming device, which, in the embodiment depicted, is a vehicle drivetrain 22. The drivetrain 22 includes a variable speed transmission 26 and a differential 30. The crankshaft 18 is selectively operatively connectable to a transmission input shaft 34 to supply rotary power and torque thereto. The transmission is configured to transmit the rotary power and torque from the input shaft 34 to an output shaft 38 at a plurality of different speed and torque ratios, as understood by those skilled in the art. Rotary power and torque from the output shaft 38 may be distributed between two or more wheels 42 by the differential 30.

Although the primary power consuming device in the embodiment depicted is a vehicle drivetrain 22, those skilled in the art will recognize other primary power consuming devices that may be employed within the scope of the present disclosure. For example, a primary power consuming device may be an electrical generator, a hydraulic system for a work machine such as a wheel loader, etc. In the context of the present disclosure, an engine is selectively operatively connectable to a primary power consuming device if it is continuously operatively connected thereto, or if it is connectable by the engagement of a torque transmitting device such as a clutch, a hydrodynamic torque converter, etc.

A motor 46 is configured to selectively generate rotary power and to transmit the rotary power via rotation of a rotor 50. Those skilled in the art will recognize a variety of motor types and configurations that may be employed, such as electric motors, hydraulic motors, pneumatic motors, etc. The motor 46 is an electric motor in the preferred embodiment. The power output of the motor 46 and the rotational speed of the rotor 50 are selectively variable, and are independent of the rotational speed of the crankshaft 18. More specifically, the motor 46 is powered by a battery 52 or other energy storage device different from the engine 14, and therefore the rotational speed of the rotor 50 is not dependent on the rotational speed of the crankshaft 18. For example, the motor 46 may achieve maximum rotational speed of the rotor 50 when the engine 14 is off and the crankshaft 18 is stationary; the rotational speed of the rotor 50 may also be zero when the crankshaft 18 is rotating at any rotational speed.

The powertrain 10 further includes at least one pump 54. The pump 54 may be an engine oil pump in fluid communication with the engine 14 to supply lubricating and cooling oil thereto via conduit 58. The pump may also be a transmission pump in fluid communication with the transmission 26 via conduit 58A to supply pressurized fluid thereto, such as for cooling and lubrication, and to provide pressurized fluid to clutch apply chambers (not shown) to cause the engagement of clutches (not shown), as understood by those skilled in the art.

Other pumps are contemplated within the scope of the present disclosure; for example, pump 54 may be an air compressor for a pneumatic braking system, a fuel pump, a water pump, etc. The pump 54 includes a rotor 62 that supplies rotary power to the pump 54 to drive an impeller (not shown) or other fluid pressure producing device, such as a piston (not shown).

The powertrain 10 also includes an epicyclic geartrain 66 having first, second, and third members. The epicyclic geartrain 66 in the embodiment depicted is a planetary gearset, and the first, second, and third members include a ring gear 70, a sun gear 74, and a planet carrier 78 rotatable about a common axis. The geartrain 66 further includes a plurality of planetary pinion gears 82 that are rotatably mounted to the planet carrier 78. Each of the planetary pinion gears 82 is meshingly engaged with the sun gear 74 and with the ring gear 70.

The ring gear 70 is operatively connected to the crankshaft 18 to receive rotary power therefrom. More specifically, the ring gear 70 has outer teeth that meshingly engage with a gear member 86 that is connected to the crankshaft 18 for rotation therewith; thus, rotation of the crankshaft 18 causes rotation of gear 86 and, correspondingly, rotation of ring gear 70. In the event that the pump 54 is a transmission pump, the crankshaft 18 may be operatively connected to the ring gear 70 via the transmission input shaft 34 or another transmission member operatively connected to the crankshaft for rotation therewith.

The sun gear 74 is operatively connected to the rotor 50 of the motor 46 for rotation therewith and to receive rotary power therefrom. The planet carrier 78 is operatively connected to the rotor 62 of the pump 54 for rotation therewith. As understood by those skilled in the art, the planet carrier 78 is operatively connected to the ring gear 70 and the sun gear 74 to concurrently receive rotary power from the ring gear 70 and from the sun gear 74. Accordingly, the planet carrier 78, and therefore the pump 54, is operatively connected to the crankshaft 18 and operatively connected to the rotor 50 via the ring gear 70 and the sun gear 74, respectively, to concurrently receive rotary power from the engine 14 and the motor 46.

As used herein, the terms "first member," "second member," and "third member" do not necessarily refer to a particular member of an epicyclic geartrain. For example, in the case of a planetary gearset, a "first member" may be any one of a ring gear, a sun gear, and a planet carrier; a "second member" may be any one of a ring gear, sun gear, and planet carrier; and a "third member" may be any one of a ring gear, sun gear, and planet carrier.

It should be noted that the rotor 62 of the pump 54 may be continuously operatively connected to the planet carrier 78 for rotation therewith, as shown in FIG. 1. That is, the powertrain 10 may be characterized by the absence of a selectively engageable torque transmitting device, such as a clutch, etc., to disconnect the rotor 62 from the planet carrier 78; no other rotary power consuming or generating device is operatively connected to the planet carrier 78 for rotation therewith. It should be further noted that the motor 46 may be dedicated to supplying power to the pump 62, as shown in FIG. 1. That is, all power from the motor 46 may be transmitted through the sun gear 74 for transmission to the pump 54.

Means may be provided for selectively disengaging the motor 46 from the sun gear 74. In the embodiment depicted, the means comprise a brake 90 that is connected to the rotor 50 and a stationary member 94. The brake is selectively engageable to connect the rotor 50 to the stationary member 94 and thereby prevent rotation of the rotor 50 and, correspondingly, the sun gear 74. Those skilled in the art will recognize other means for selectively disengaging the motor 46 from the sun gear 74. For example, a clutch may selectively disconnect the rotor 50 from the sun gear 74, or a switch may selectively disconnect the motor 46 from its electrical power source to prevent the motor from receiving or, if the motor acts as a generator, from transmitting, electrical energy.

The powertrain 10 further includes a controller 98 that is operatively connected to the motor 46 to control the amount of rotary power produced by the motor and to control the rotational speed of the rotor 50 via control signals 100. Sensors 102A, 102B monitor various powertrain conditions and transmit sensor signals 106A, 106B to the controller 98. An ignition switch 108 and an accelerator pedal 109 are also operatively connected to the controller 98. A position sensor (not shown) transmits sensor signals indicative of the position of the accelerator pedal 109 to the controller 98.

In the context of the present disclosure, a "controller" is any device or set of devices that are operative to perform the logical operations disclosed herein. A controller may be mechanical, electronic, etc. A typical electronic controller typically includes a microprocessor, ROM and RAM and appropriate input and output circuits of a known type for receiving various input signals and for outputting various control commands. An electronic controller may be programmable via software or have circuits physically dedicated to performing the logical operations described herein.

Figure 2:
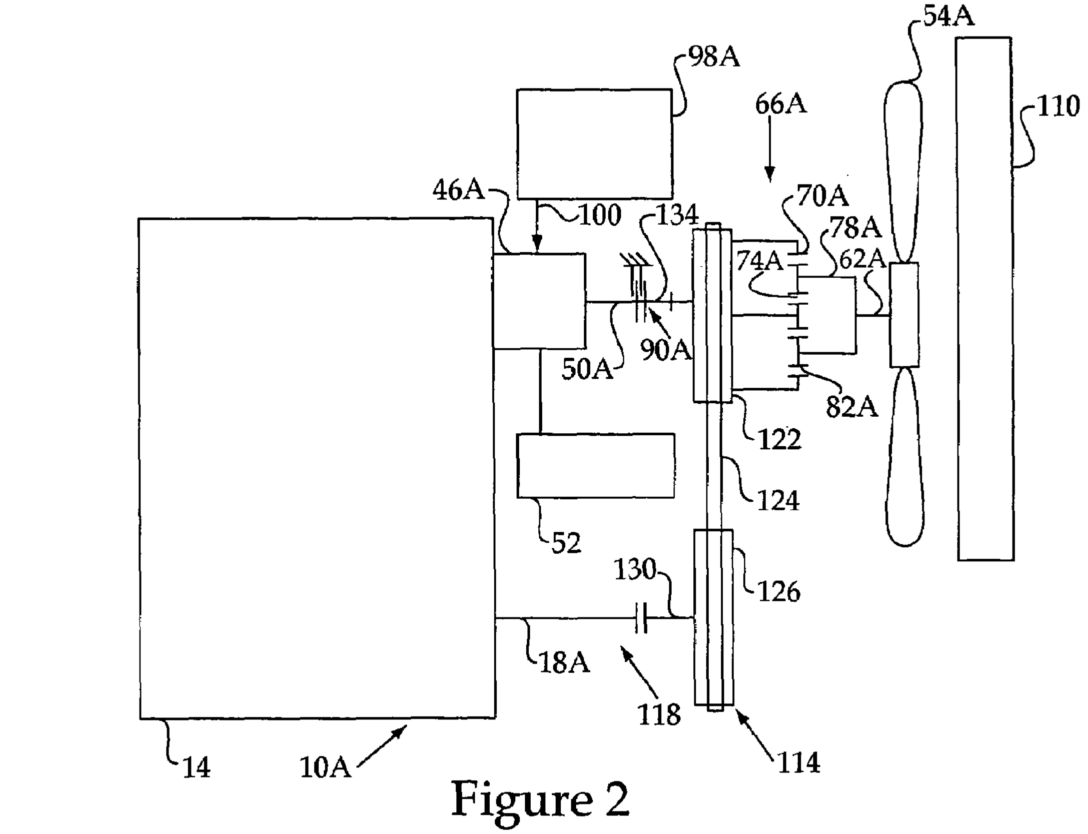
FIG. 2 is a schematic depiction of an alternative powertrain configuration.

Referring to FIG. 2, wherein like reference numbers refer to like components from FIG. 1, an alternative powertrain 10A is schematically depicted. Powertrain 10A includes an engine 14A having an engine output member, i.e., crankshaft 18A. Crankshaft 18A is operatively connected to a drivetrain (as shown at 22 in FIG. 1). Powertrain 10A also includes a motor 46A having a rotor 50A.

The rotational speed of the rotor 50A is selectively variable, and is independent of the rotational speed of the crankshaft 18A. The power output of the motor 46A and the rotational speed of the rotor 50A is controlled by controller 98A via control signals 100. An ignition switch, sensors, and accelerator pedal, as shown at 108, 102A, 102B, 109, respectively, in FIG. 1, are operatively connected to the controller 98.

The powertrain 10A further includes at least one pump 54A. In the embodiment depicted, pump 54A is a cooling fan positioned to cause air to flow over and through a radiator 110.

The powertrain 10A also includes an epicyclic geartrain 66A. The epicyclic geartrain 66A in the embodiment depicted is a planetary gearset, having a ring gear 70A, a sun gear 74A, and a planet carrier 78A rotatable about a common axis. The geartrain 66A further includes a plurality of planetary pinion gears 82A that are rotatably mounted to the planet carrier 78A. Each of the planetary pinion gears 82A is meshingly engaged with the sun gear 74A and with the ring gear 70A.

The ring gear 70A is operatively connected to the crankshaft 18A via a belt drive 114 and a clutch 118. More specifically, the belt drive 114 includes a first pulley 122 connected to the ring gear 70A for rotation therewith. A belt 124 interconnects the first pulley 122 and a second pulley 126. The second pulley 126 is connected to a shaft 130 for rotation therewith. The clutch 118 is selectively engageable to operatively connect the shaft 130 to the crankshaft 18A for unitary rotation therewith. Thus, when the clutch 118 is engaged, the crankshaft 18A is operatively connected to the ring gear 70A to transmit rotary power and torque thereto via the shaft 130 and belt drive 114, and rotation of the crankshaft 18A causes rotation of the ring gear 70A.

The sun gear 74A is operatively connected to the rotor 50A of the motor 46 for rotation therewith and to receive rotary power therefrom. In the embodiment depicted, an interconnecting member 134 connects the rotor 50A to the sun gear 74A, and extends through a hole in the first pulley 122. A bearing (not shown) may be provided between the first pulley 122 and the interconnecting member 134 to ensure that the pulley 122 and the interconnecting member 134 rotate freely and independently from one another.

It may be desirable to package the epicyclic geartrain 66A inside the first pulley 122 to improve packaging efficiency. The first pulley 122 and the ring gear 70A may be formed from a single casting.

The planet carrier 78A is operatively connected to the rotor 62A of pump 54A for rotation therewith. As understood by those skilled in the art, the planet carrier 78A is operatively connected to the ring gear 70A and the sun gear 74A to concurrently receive rotary power from the ring gear 70A and from the sun gear 74A. Accordingly, the planet carrier 78A, and therefore the pump 54A, is operatively connected to the crankshaft 18A and operatively connected to the rotor 50A via the ring gear 70A and the sun gear 74A, respectively, to concurrently receive rotary power from the engine 14A and the motor 46A.

It should be noted that the rotor 62A of the pump 54A may be continuously operatively connected to the planet carrier 78A for rotation therewith, as shown in FIG. 2. That is, the powertrain 10A may be characterized by the absence of a selectively engageable torque transmitting device, such as a clutch, etc., to disconnect the rotor 62A from the planet carrier 78A; no other rotary power consuming or generating device is operatively connected to the planet carrier 78A for rotation therewith. It should be further noted that the motor 46A may dedicated to supplying power to the pump 54A, as shown in FIG. 2. That is, all power from the motor 46A is transmitted through the sun gear 74A for transmission to the pump 54A.

Means may be provided for selectively disengaging the motor 46A from the sun gear 74A. In the embodiment depicted, the means comprise a brake 90A that is connected to the rotor 50A and a stationary member 94. The brake is selectively engageable to connect the rotor 50A to the stationary member 94 and thereby prevent rotation of the rotor 50A and, correspondingly, the sun gear 74A. Those skilled in the art will recognize other means for selectively disengaging the motor 46 from the sun gear 74. For example, a clutch may selectively disconnect the rotor 50 from the sun gear 74, or a switch may selectively disconnect the motor 46 from its electrical power source to prevent the motor from receiving or, if the motor acts as a generator, from transmitting, electrical energy.

INDUSTRIAL APPLICABILITY

The present disclosure finds application generally to any powertrain in which an engine drives a pump and a primary power consuming device different from the pump. For example, the primary power consuming device may be a vehicle drivetrain and, ultimately, a tractive device, to propel a vehicle; a hydraulic system for a work implement in a work machine such as a wheel loader; an electrical generator; etc. The pump may be any fluid pump driven by the engine and that is not the primary power consuming device. For example, the pump may be an engine oil pump, a transmission pump, a cooling fan, an air compressor for a pneumatic braking system, a fuel pump, a water pump, etc.

Figure 3:
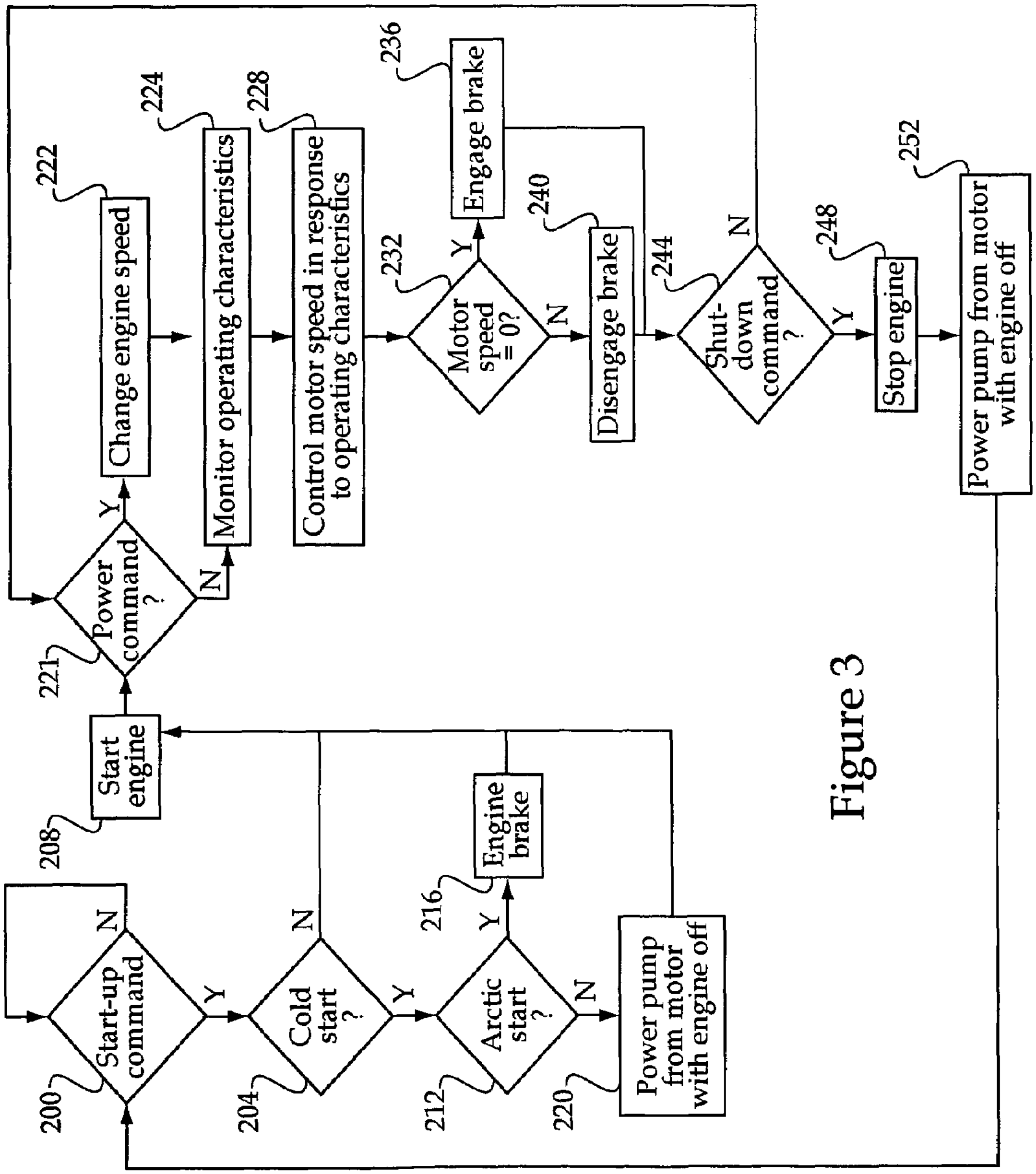
FIG. 3 is a flow chart depicting a method of operating the powertrain of FIG. 1.

FIG. 3 depicts a method for operating the powertrain 10 of FIG. 2 when the pump 54 is an engine oil pump; the method of FIG. 3 also represents an exemplary control logic for the controller 98. Referring to FIGS. 1 and 3, the method includes inquiring whether an engine start up command is being transmitted at step 200. In the embodiment depicted, the controller 98 determines whether an engine start up command is being transmitted by detecting the position of the ignition switch 108, as understood by those skilled in the art. If the ignition switch is in the off position, that is, if a start up command is not being transmitted, then the controller 98 repeats step 200.

If the ignition switch 108 is in the on position, that is, if a start up command is being transmitted, then the controller inquires whether cold start conditions exist at step 204. If the answer to the inquiry at step 204 is no, that is, if cold start conditions do not exist, then the controller 98 commands the engine to start at step 208. If the answer to the inquiry at step 204 is yes, that is, if cold start conditions exist, then the controller inquires whether arctic start conditions exist at step 212. Arctic start conditions exist when the ambient air temperature, or the temperature of the engine oil, is below a predetermined temperature such as −10 degrees Celsius. If arctic start conditions exist, then the controller 98 causes the brake 90 to engage, thereby to prevent the rotation of the rotor 50, at step 216, and then proceeds to start the engine 14 at step 208.

If the answer to inquiry 204 is no, that is, if arctic start conditions to do not exist, then the controller 98 causes the motor 46 to transmit power to the pump to operate the pump with the engine off (and the crankshaft at zero rotational speed) for a predetermined amount of time at step 220 to prelubricate the engine 14 prior to commanding the engine to start at step 208.

After the engine 14 has been started, the rotation of the crankshaft 18 is transmitted to the primary power consuming device, i.e., the drivetrain 22. The rotation of the crankshaft 18 also causes rotation of the rotor 62 of the pump 54, and power is transmitted from the engine 14 to the pump 54, via the ring gear 70 and the planet carrier 78. The controller 98 inquires whether there is a command to change the amount of power supplied by the engine 14 to the drivetrain 22 at step 221. In the embodiment depicted, a command to change the amount of power supplied by the engine 14 to the drivetrain 22 is effected by changing the position of a human-operable input device such as the accelerator pedal 109. Those skilled in the art will recognize other ways of effecting such a command within the scope of the present disclosure. For example, other manual input devices, such as joysticks, buttons, etc., may be employed, or the command may be generated by the controller if control of the powertrain 10 is automated.

If the answer to the inquiry at step 221 is yes, that is, if there is a command to change to amount of power supplied to the drivetrain, then the controller causes a change in the speed of the crankshaft at step 222, such as by changing the amount of fuel provided to the engine 14 or changing the position of a throttle valve in an air intake system of the engine 14. The controller 98 then proceeds to step 224. If the answer to the inquiry at step 221 is no, then the controller proceeds to step 224 without performing step 222.

The controller monitors various powertrain characteristics that have a variable value at step 224. More specifically, the sensors 102A, 102B monitor the various powertrain characteristics and transmit sensor signals indicative of the values of the characteristics to the controller 98. The characteristics are indicative of the oil requirements of the engine and the amount of oil flow being provided by the pump 54. Exemplary monitored characteristics include engine speed, engine load, oil pressure, motor current, etc.

The controller 98 then controls the speed of the rotor 50 of the motor 46 in response to the values indicated by the sensor signals according to a predetermined algorithm at step 228 so that the rotor speed, and motor power output, varies with the values of the characteristics to ensure adequate oil flow to the engine 14. More specifically, the controller 98 causes the motor 46 to provide rotary power to the pump via the sun gear 74 and the planet carrier 78 concurrently with power supplied by the engine 14 via the ring gear 70 and the planet carrier 78; the amount of power supplied to the pump 54 from the motor 46 is the difference between the amount of power the pump 54 requires to provide adequate oil flow in accordance with the values of the powertrain characteristics and the amount of power supplied to the pump 54 by the engine 14.

Figure 4:
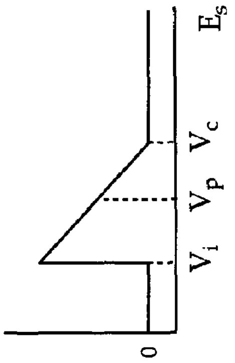
FIG. 4 is a graphical depiction of an exemplary relationship between engine speed and motor speed.

FIG. 4 is an exemplary relationship between the rotational speed $E_s$ of the crankshaft 18 and the rotational speed $M_s$ of the rotor 50 when the pump 54 is an engine oil pump. The relationship depicted in FIG. 4 may be achieved by the controller 98 by directly correlating the motor speed with the engine speed, or may be achieved indirectly through control of the motor speed in response to other powertrain characteristics. When the engine 14 is off, i.e., when the crankshaft rotational speed is zero, the motor 14 is also at zero speed, except during steps 220 and 252. When the engine is started and achieves idle speed $V_i$, the motor speed is above zero and varies in response to the values of the characteristics monitored at step 224 in accordance with the algorithm employed at step 228.

The powertrain 10 is preferably configured such that the rotational speed of the rotor 50 is zero when the speed of the crankshaft 18 is above a predetermined speed $V_C$. In the preferred embodiment, the predetermined speed $V_C$ is selected based on an expected duty cycle of the engine 14. More specifically, the predetermined speed $V_C$ is selected at the low end of a typical operating speed range of the engine, i.e., the speed range at which the crankshaft 18 rotates for a substantial amount, or a majority of, the time the engine 14 is operating. For example, if the powertrain 10 is for an over-the-road truck, then the expected duty cycle of the engine includes a substantial amount of time at or above $V_C$ when the over-the-road truck maintains a substantially constant cruising speed; engine speeds lower than $V_C$ are primarily employed for accelerating the truck prior to achieving the cruising speed.

Oil flow requirements are typically higher at engine speeds lower than the typical operating speed range. For example, peak oil flow is required at peak torque, which occurs when the crankshaft speed is $V_P$. The planetary gearset provides a gear reduction from the crankshaft 18 so that the crankshaft 18 supplies power to the pump sufficient to meet oil flow requirements only when the crankshaft speed is higher than the predetermined speed $V_C$; during periods of high oil flow requirements at crankshaft speeds below the predetermined speed $V_C$, the motor 46 supplies the difference between the amount of power required by the pump 54 to meet oil flow requirements and the amount of power supplied to the pump 54 by the crankshaft 18. Thus, the powertrain 10 improves upon the prior art because the crankshaft 18 does not supply more power to the pump 54 than is needed at crankshaft speeds within the engine's expected typical operating speed range. The gear reduction provided by the planetary gearset also reduces the torque load to the engine 14 and the starting motor (not shown), resulting in less power required to start the engine compared to the prior art, especially in very cold conditions.

Referring again to FIGS. 1 and 3, at step 232 the controller 98 inquires whether the speed of the rotor 50 should be zero according to the values of the variable characteristics monitored at step 224 and in accordance with the algorithm employed at step 228. If the answer to the inquiry at step 232 is yes, then the controller 98 causes the brake 90 to engage, thereby to prevent the rotor 50 and the sun gear 74 from rotating at step 236. If the answer to the inquiry at step 232 is no, then the controller disengages the brake at step 240 if the brake is engaged.

Following step 236 or step 240, the controller inquires whether an engine shutdown command is being transmitted. In the embodiment depicted, an engine shutdown command is transmitted by moving the ignition switch 108 from the on position to the off position. If the answer to the inquiry at step 244 is no, then the controller returns to step 221. If the answer to the inquiry at step 244 is yes, then the controller commands the engine 14 to stop at step 248. At step 252, the controller 98 commands the motor 46 to supply power to the pump 54 (when the engine is off and the rotational speed of the crankshaft is zero) for a predetermined amount of time for "postlubrication" of the engine 14.

Figure 5:
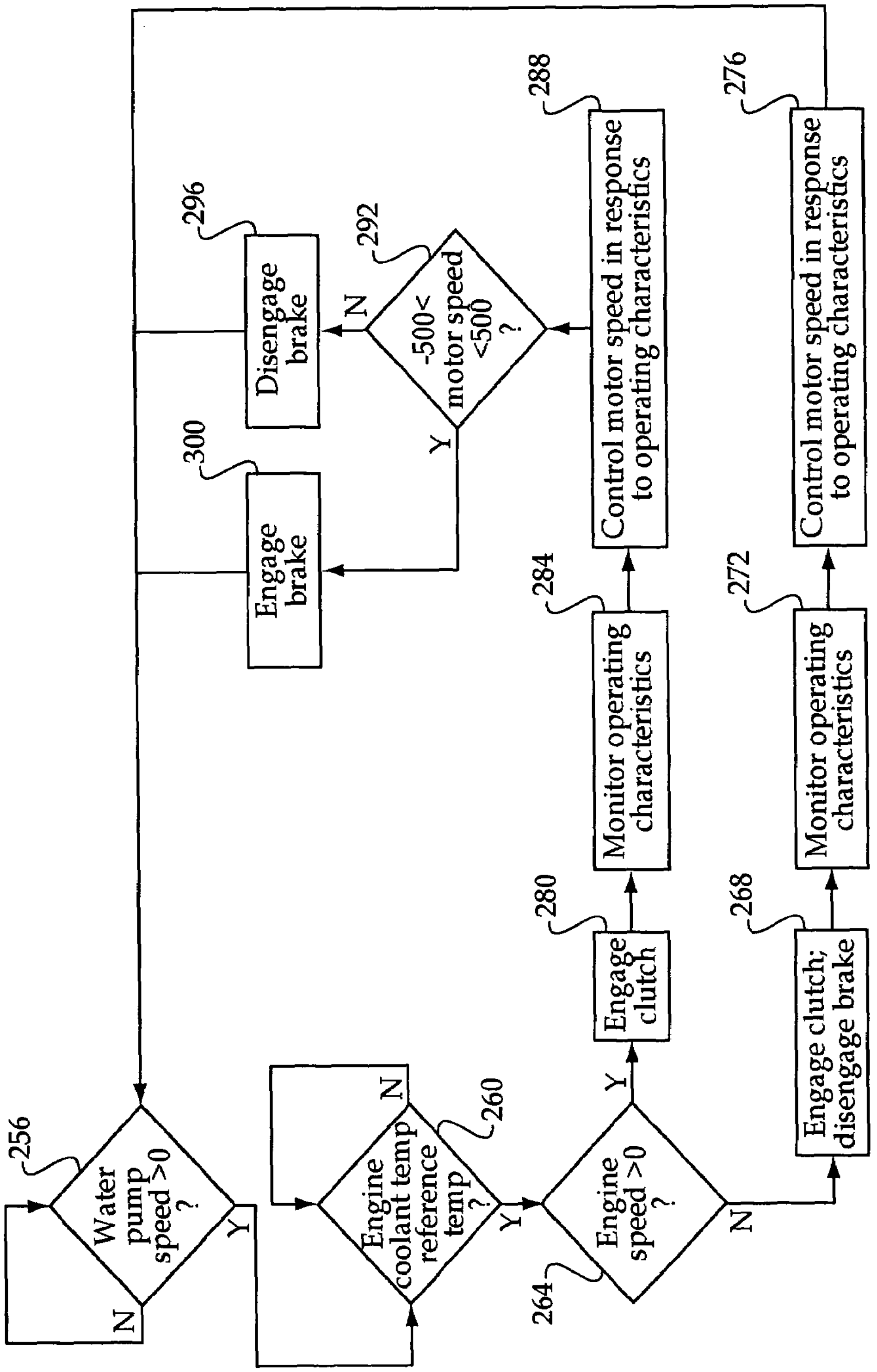
FIG. 5 is a flow chart depicting a method of operating the powertrain of FIG. 2.

FIG. 5 depicts a method of operation of the powertrain 10A of FIG. 2. The method of FIG. 5 is also an exemplary control logic for the controller 98A during powertrain operation. Referring to FIGS. 2 and 5, the controller 98A inquires whether a water pump (not shown) is in operation at step 256, i.e., whether the speed of the water pump rotor is greater than zero so that the pump is causing coolant to flow from the engine 14 to the radiator 110. If the answer to the inquiry at step 256 is no, then the controller 98A repeats step 256. If the answer to the inquiry at step 256 is yes, that is, if the water pump is operating, then the controller 98A inquires whether the coolant is above a predetermined temperature at step 260.

If the answer to the inquiry at step 260 is no, then the controller 98A repeats step 260. If the answer to the inquiry at step 260 is yes, that is, if the coolant is above the predetermined temperature, then the controller 98A inquires whether the engine 14 is on at step 264, i.e., whether the rotational speed of the crankshaft 18A is greater than zero. If the answer to the inquiry at step 264 is no, then the controller controls the speed of the pump 54A by controlling the speed of the motor at steps 268, 272, and 276.

During steps 268, 272, and 276, the rotational speed of the crankshaft is zero, and thus the rotational speed of the pump 54A is determined solely by the rotational speed of the rotor 50A of the motor 46A. At step 268, the controller 98A engages the clutch 118 if it is disengaged, and disengages the brake 90A if it is engaged. The controller 98A monitors various powertrain characteristics that have a variable value at step 272. More specifically, sensors monitor the various powertrain characteristics and transmit sensor signals indicative of the values of the characteristics to the controller 98A. The characteristics are indicative of the operating temperature of the engine 14A, and, therefore, the desired flow rate of air to be generated by the cooling fan 54A. Exemplary characteristics include the coolant temperature at the radiator inlet and outlet, the engine oil temperature, engine crankshaft speed, the engine load, etc. Engine temperature, and accordingly cooling requirements, vary with engine speed and power output, ambient atmospheric temperature, vehicle speed (and accordingly, the amount of air flow over the radiator 110 as a result of vehicle movement), etc.

The controller 98 then controls the speed of the rotor 50A of the motor 46A at step 276 in response to the values indicated by the sensor signals according to a predetermined algorithm so that the rotor speed, and motor power output, varies with the values of the characteristics to ensure adequate air flow over the radiator 110 as indicated by the characteristics. In a preferred embodiment, the algorithm employs proportional-integral control. The controller then returns to step 256.

If the answer to the inquiry at step 264 is yes, that is, if the engine crankshaft speed is greater than zero, then the controller causes the clutch 118 to engage at step 280 if the clutch 118 is disengaged to ensure that the crankshaft supplies power to the cooling fan 54A via the belt drive 114 and the epicyclic geartrain 66A. Between steps 280 and 284, the controller 98A inquires whether there is a command to change the amount of power supplied by the engine 14 to the drivetrain 22, as described at step 221 in FIG. 4, and causes a change in the speed of the crankshaft 18A, as described at step 222 in FIG. 4, in response to the presence of such a command.

The controller 98A then monitors the characteristics at step 284, as at step 272, and controls the speed and power output of the motor 46A in response to the values of the operating characteristics monitored at step 288, preferably with a proportional-integral control algorithm.

More specifically, the controller 98A causes the motor 46A to provide power to the pump 54A via the sun gear 74A and the planet carrier 78A concurrently with power supplied by the engine 14A via the ring gear 70A and the planet carrier 78A; the amount of power supplied to the pump 54A from the motor 46A is the difference between the amount of power the pump 54A requires to provide adequate air flow in accordance with the values of the powertrain characteristics and the amount of power supplied to the pump 54A by the crankshaft 18A. When the difference is positive, that is, when the crankshaft 18A does not supply sufficient power to the pump 54A as determined by the values of powertrain characteristics, the controller 98A causes the motor 46A to provide power to the pump 54A to supplement the power provided by the engine crankshaft 18A. When the difference is negative, that is, when the crankshaft 18A supplies more power to the pump 54A than conditions indicate is necessary, the controller 98A causes the motor 46A to act as a generator; the motor 46A then receives the excess rotary power from the crankshaft 18A through the epicyclic geartrain 66A and stores the it in battery 52.

Accordingly, the powertrain 10A enables substantially infinitely variable cooling fan speeds at almost any engine crankshaft speed. Prior art powertrains are configured so that, at any given engine speed, the crankshaft provides sufficient power to the cooling fan to generate the maximum fan speed that may be required for cooling purposes. However, when powertrain conditions are such that the cooling system does not require the maximum fan speed, the power used by the fan is excessive and results in inefficiencies. The powertrain 10A of FIG. 2 enables the motor 46A to provide power to the cooling fan 54A when the power supplied by the crankshaft 18A is not sufficient for the operating conditions of the engine 14A, and enables the motor 46A to recover energy from the crankshaft 18A when the crankshaft 18A supplies more power to the cooling fan 18A than the operating conditions warrant.

At step 292, the controller 98A inquires whether the absolute value of the speed of the rotor 50A should be less than a predetermined amount, e.g., 500 revolutions per minute, in accordance with the values of the powertrain characteristics and the algorithm employed at step 288. If the answer to the inquiry at step 292 is yes, then the controller 98A causes the brake 90A to engage at step 300 to prevent rotation of the rotor 50A and the sun gear 74A. If the answer to the inquiry at step 292 is no, then the controller 98A causes the brake 90A to disengage at step 296, if the brake is engaged, to allow rotation of the rotor 50A and the sun gear 74A. After steps 296 and 300, the controller 98A returns to step 256.

It should be noted that it may be difficult to achieve fan speeds of less than a predetermined amount at high crankshaft speeds because the motor 46A may have to spin at prohibitively high speeds. Accordingly, the clutch 118 may be disengaged to disconnect the crankshaft 18A from the epicyclic geartrain 66A so that the speed of the pump 54A is determined solely by the motor 46A during engine operation.

Referring again to FIG. 1, either of the methods of FIGS. 3 and 5 are modifiable for an application in which the pump 54 is a transmission pump in fluid communication with the transmission 26. For example, and with reference to FIGS. 1 and 5, if the engine speed is greater than zero at step 264, then the controller 98 may monitor operating characteristics that are indicative of fluid flow and fluid pressure requirements of the transmission 26 at step 280. Such operating characteristics may include the rotational speed of the input shaft 34, the rotational speed and power output of the output shaft 38, whether a speed ratio change is anticipated, the fluid pressure inside the hydraulic circuit of the transmission (such as within the clutch apply chambers), etc. At step 288, the motor speed may varied according to a predetermined algorithm in response to the values of the characteristics monitored at step 288 to alter the output of the pump 54 to ensure adequate fluid flow and pressure to the transmission 26. If the engine 14 supplies excessive power to the pump 54, as indicated by the values of the characteristics and in accordance with the algorithm, then the motor 46 may be operated as a generator. If the engine is off at step 264, for example, in a hybrid vehicle, then the motor may be controlled as the sole source of power to the pump.

Advantageously, the motor 46 may be used to compensate for variations in fluid flow and pressure requirements that may occur because of manufacturing tolerances in transmissions, or that may occur because of wear during the operating life of the transmission.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims. For example, although the epicyclic geartrains depicted are planetary gearsets, those skilled in the art will recognize other epicyclic geartrains that may be employed, such as differentials. Although the motors 46, 46A are described primarily as electric motors, those skilled in the art will recognize other motors that may be employed, such as air motors, variable displacement hydraulic motors, etc.

What is claimed is:

1. A powertrain comprising:

an engine configured to produce rotary power and having an engine output member characterized by a selectively variable rotational speed;

a motor configured to produce rotary power and having a rotor characterized by a selectively variable rotational speed that is independent of the rotational speed of the engine output member;

a primary power consuming device being selectively operatively connectable to the engine to selectively receive rotary power therefrom;

a pump;

an epicyclic geartrain including first, second, and third members; said first member being operatively connected to the engine to receive rotary power therefrom, said second member being operatively connected to the motor to receive rotary power therefrom, and said third member being operatively connected to the pump to transmit rotary power thereto;

means, including a controller and the epicyclic geartrain, for providing rotary power to the pump exclusively from the engine when an engine speed is above a predetermined value; and means, including the controller and the epicyclic geartrain, for providing rotary power to the pump from the engine and from the motor concurrently when the engine speed is below the predetermined value and greater than zero.

2. The powertrain of claim 1, further comprising a brake for selectively preventing rotation of the motor and the second member.

3. The powertrain of claim 1, wherein the controller is operatively connected to the motor and configured to selectively cause the motor to produce rotary power when the engine output member speed is zero.

4. The powertrain of claim 1, wherein the pump is in fluid communication with the engine.

5. The powertrain of claim 1, wherein the pump is an air compressor.

6. The powertrain of claim 1, wherein the pump is a fan.

7. A powertrain comprising:

an engine configured to produce rotary power and having an engine output member characterized by a selectively variable rotational speed;

a motor configured to produce rotary power and having a rotor characterized by a selectively variable rotational speed that is independent of the rotational speed of the engine output member;

a primary power consuming device being selectively operatively connectable to the engine to selectively receive rotary power therefrom;

a pump;

an epicyclic geartrain including first, second, and third members; said first member being operatively connected to the engine to receive rotary power therefrom, said second member being operatively connected to the motor to receive rotary power therefrom, and said third member being operatively connected to the pump to transmit rotary power thereto; and a selectively engageable and disengageable torque transmitting device; said torque transmitting device operatively interconnecting the engine output member and the first member when engaged and disconnecting the engine output member and the first member when disengaged.

8. The powertrain of claim 1, wherein the controller is operatively connected to the motor and configured to vary the speed of the rotor in response to variation of the rotational speed of the engine output member.

9. A powertrain comprising:

an engine configured to produce rotary power and having an engine output member characterized by a selectively variable rotational speed;

a motor configured to produce rotary power and having a rotor characterized by a selectively variable rotational speed that is independent of the rotational speed of the engine output member;

a primary power consuming device being selectively operatively connectable to the engine to selectively receive rotary power therefrom;

a pump;

an epicyclic geartrain including first, second, and third members; said first member being operatively connected to the engine to receive rotary power therefrom, said second member being operatively connected to the motor to receive rotary power therefrom, and said third member being operatively connected to the pump to transmit rotary power thereto;

a controller operatively connected to the motor and configured to vary the speed of the rotor in response to variation of the rotational speed of the engine output member; and wherein the powertrain is characterized by a characteristic having a variable value; and wherein the controller is configured to vary the speed of the rotor in response to variation of the variable value and in response to variation of the rotational speed of the engine output member.

10. The powertrain of claim 1, wherein the third member is continuously operatively connected to the pump.

11. The powertrain of claim 1, wherein the rotor is connected to the second member such that all rotary power from the motor is transmitted via the second member.

12. A method of operating a machine that includes an engine having an engine output member, a motor having a rotor, and a pump, the method comprising:

transmitting rotary power from the engine output member to the pump via a first member and a second member of an epicyclic geartrain;

varying the rotational speed of the engine output member in response to a command to change power supplied by the engine to a primary power consuming device different from the pump;

transmitting rotary power from the rotor to the pump via the second member and a third member of the epicyclic geartrain, said rotor being characterized by a selectively variable rotational speed that is independent of the rotational speed of the engine output member;

providing rotary power to the pump exclusively from an engine when the engine speed is above a predetermined value; and providing rotary power to the pump from the engine and from the motor concurrently when the engine speed is below the predetermined value and greater than zero.

13. The method of claim 12, further comprising supplying one of electricity and pressurized fluid to said motor to cause rotation of the rotor.

14. The method of claim 13, wherein said transmitting rotary power from the rotor to the pump includes providing rotary power to the pump exclusively from the motor.

15. The method of claim 12, wherein said transmitting rotary power from the engine output member to the pump and said transmitting rotary power from the rotor to the pump are performed concurrently.

16. A method of operating a machine that includes an engine, a motor, and a pump comprising:

providing rotary power to the pump exclusively from an engine when the engine speed is above a predetermined value; and providing rotary power to the pump from the engine and from the motor concurrently when the engine speed is below the predetermined value and greater than zero.

17. The method of claim 16, further comprising providing rotary power to the pump when the engine speed is zero.

18. The method of claim 16, further comprising monitoring a characteristic having a variable value, and varying the speed of the motor in response to the variable value and the engine speed.

19. The method of claim 18, further comprising preventing rotation of the rotor of the motor during said providing rotary power to the pump exclusively from an engine.

20. The method of claim 16, further comprising selecting the predetermined value based on a predicted engine duty cycle.

* * * * *